United States Patent
Bottorf

[11] 3,736,997
[45] June 5, 1973

[54] WALKING BEAM CONVEYOR WITH WEIGHING APPARATUS

[75] Inventor: Robert G. Bottorf, Jenkintown, Pa.

[73] Assignee: FMC Corporation, San Jose, Calif.

[22] Filed: June 21, 1972

[21] Appl. No.: 265,007

[52] U.S. Cl. .....................177/145, 198/219, 214/2
[51] Int. Cl. ..............................................G01g 19/00
[58] Field of Search...................177/145, 146, 52; 198/218, 219; 214/18 PH, 2

[56] References Cited
UNITED STATES PATENTS

| 2,597,069 | 5/1952 | Conti | 177/145 X |
| 3,299,609 | 1/1967 | Hill | 177/145 X |
| 3,299,975 | 1/1967 | Stambera et al | 177/52 |
| 3,434,555 | 3/1969 | Wyatt | 177/52 |
| 3,512,628 | 5/1970 | Keough | 198/219 |

Primary Examiner—George H. Miller, Jr.
Attorney—F. W. Anderson, C. E. Tripp and J. F. Verhoeven

[57] ABSTRACT

A hydraulically operated, long stroke walking beam conveyor with provision for weighing the article being conveyed and suitable for operation in high temperature environments is disclosed. The weighing is accomplished by load cells mounted on a fixed structure within the path of the movable carriage of the walking beam conveyor or the load cells are built into the carriage itself. Both embodiments avoid the need for a separate weighing scale.

25 Claims, 20 Drawing Figures

Patented June 5, 1973

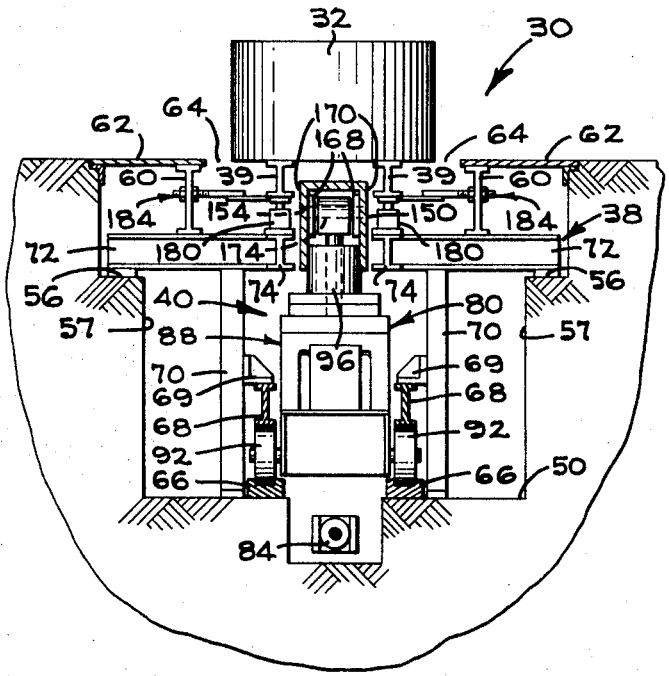
FIG_3
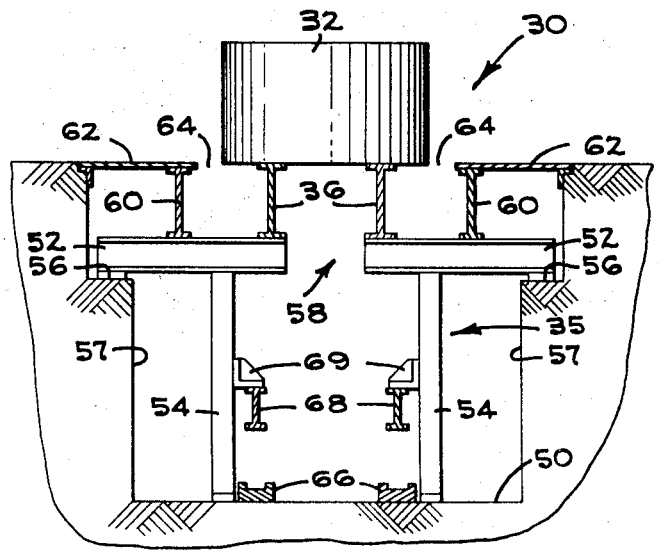
FIG_4

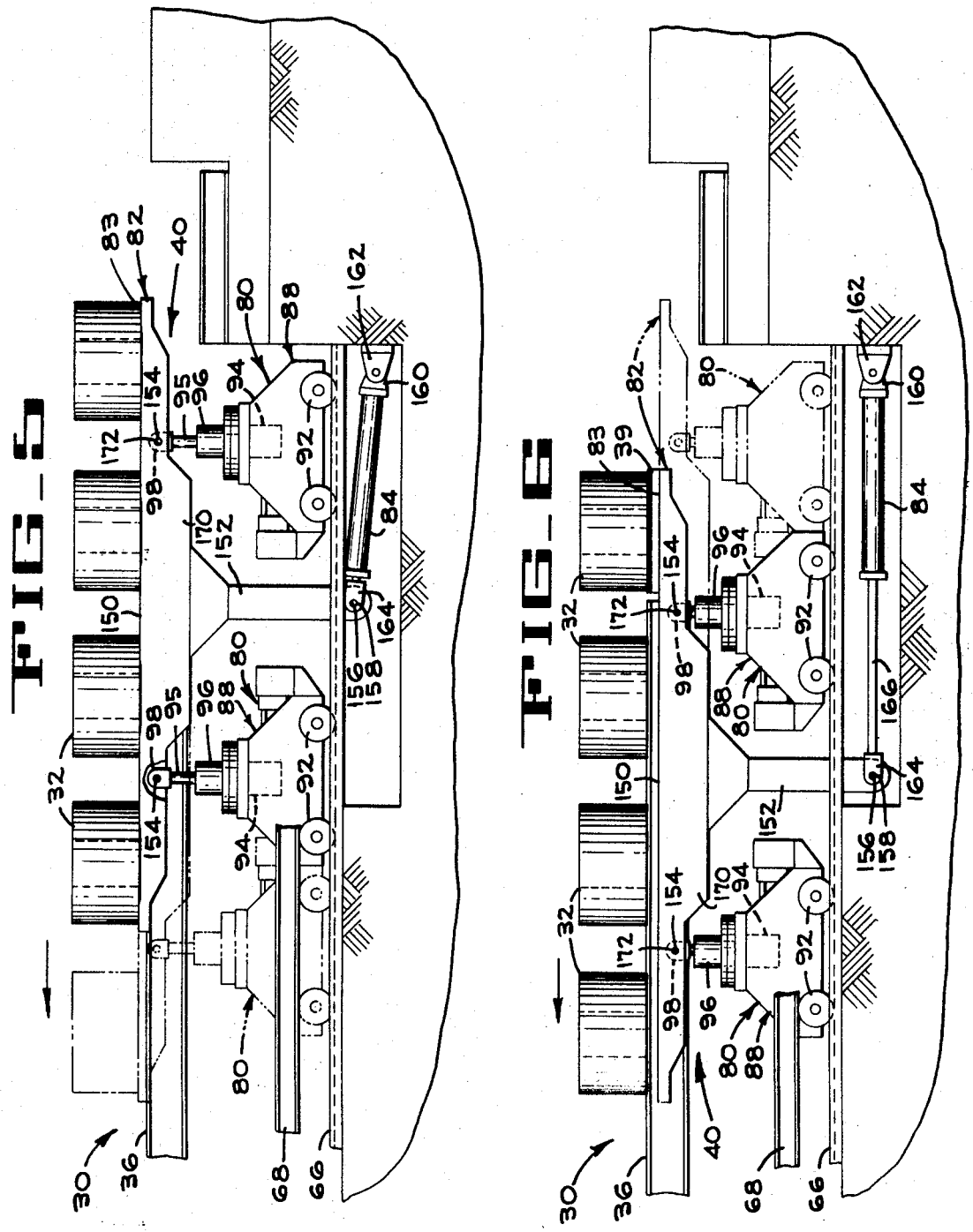

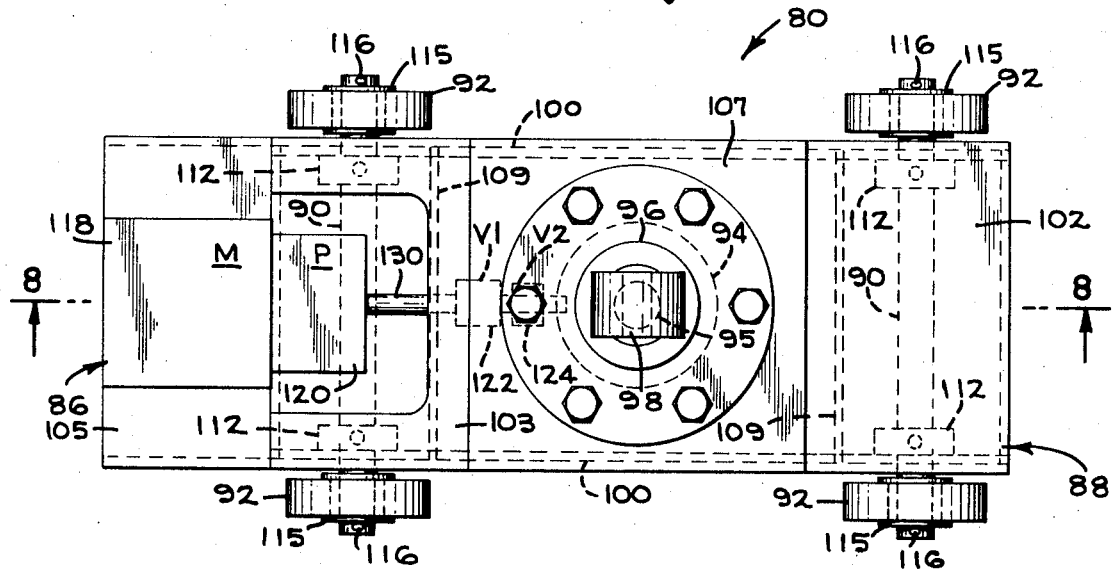
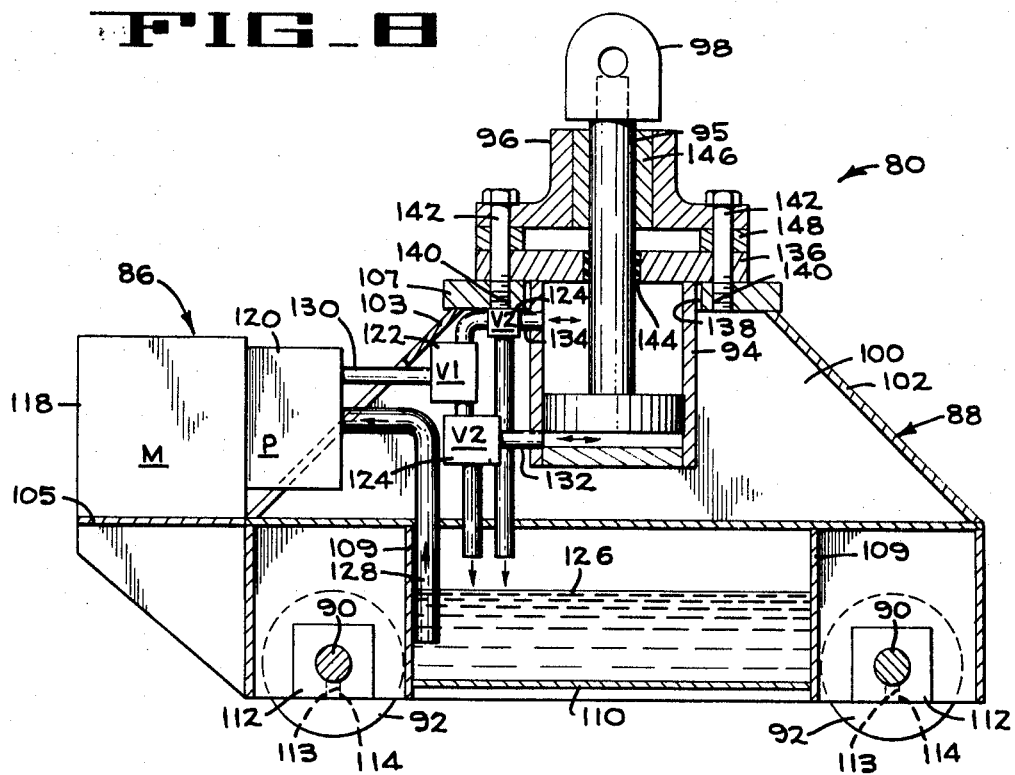

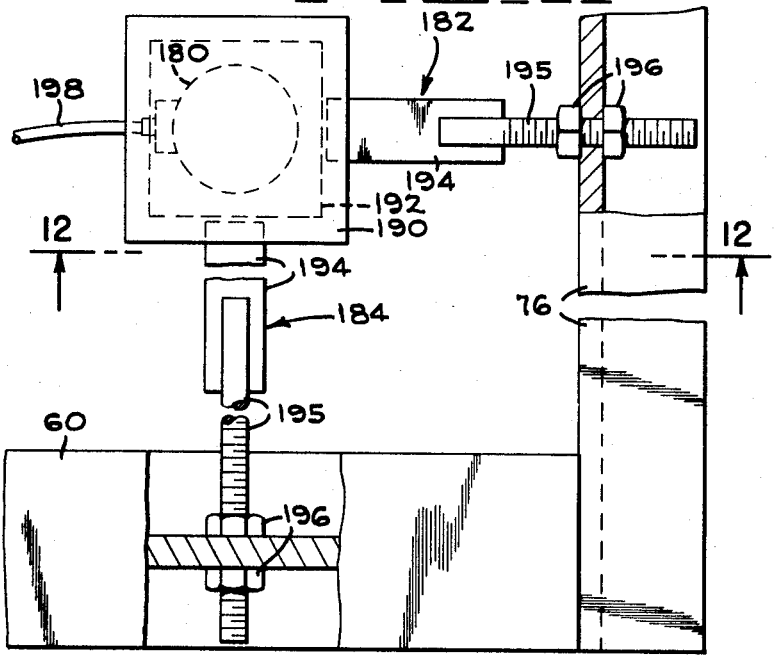
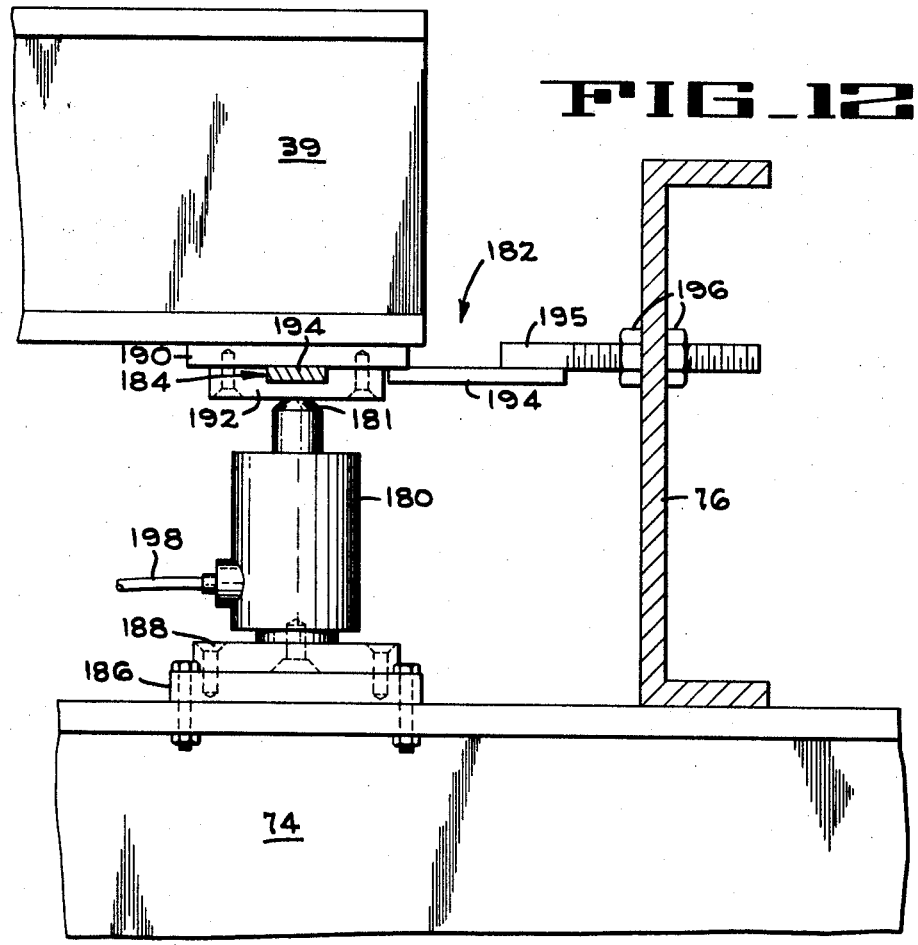

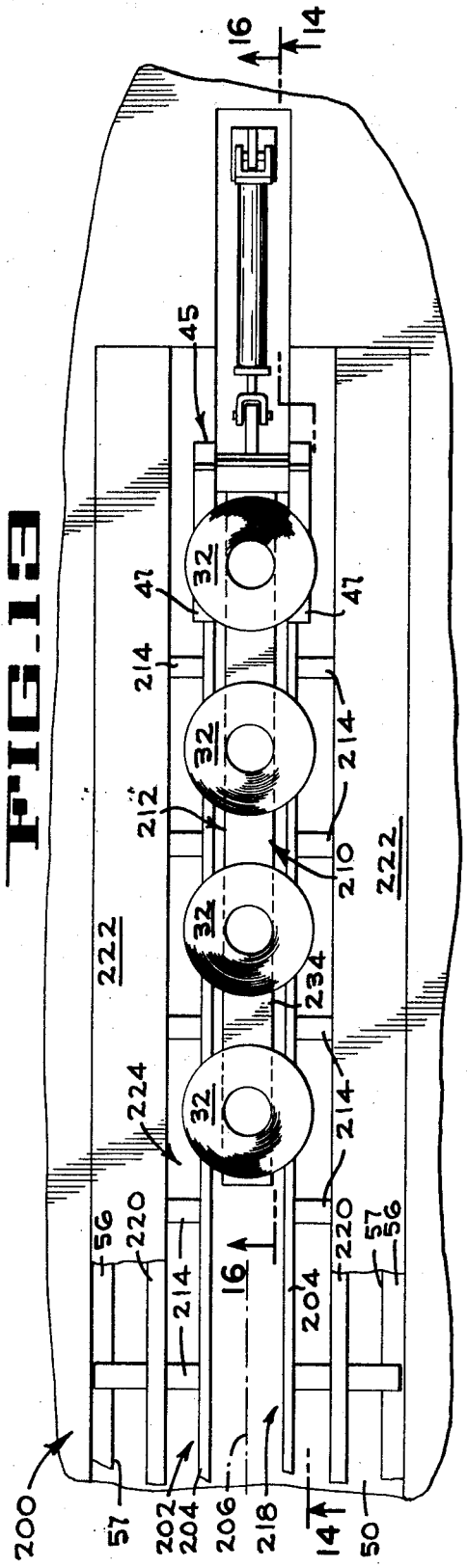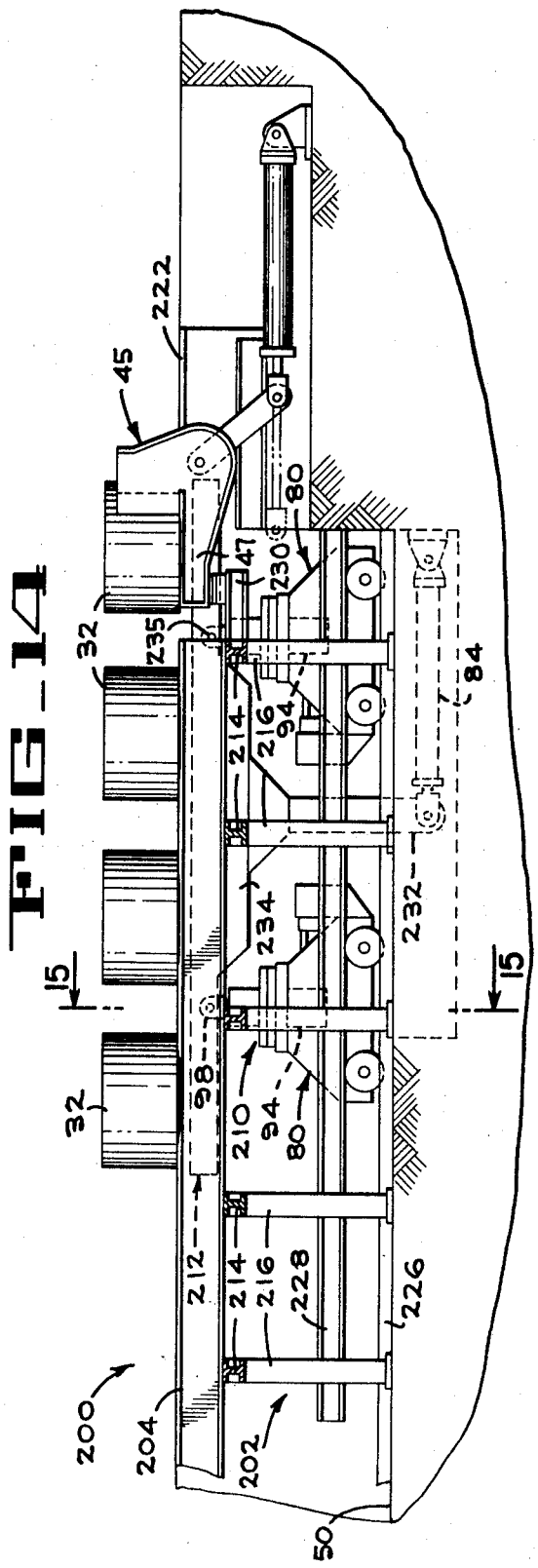

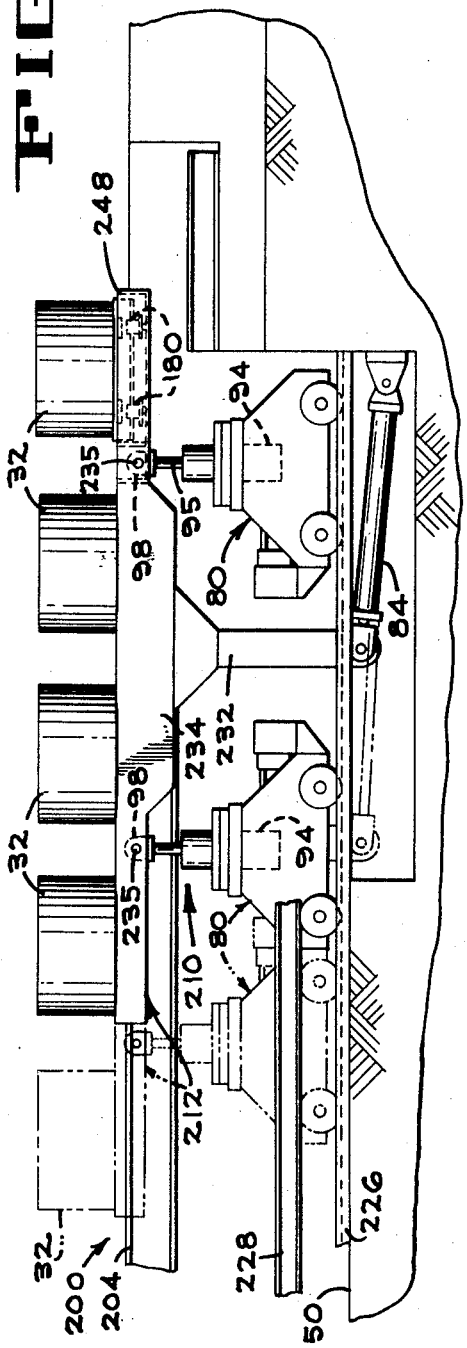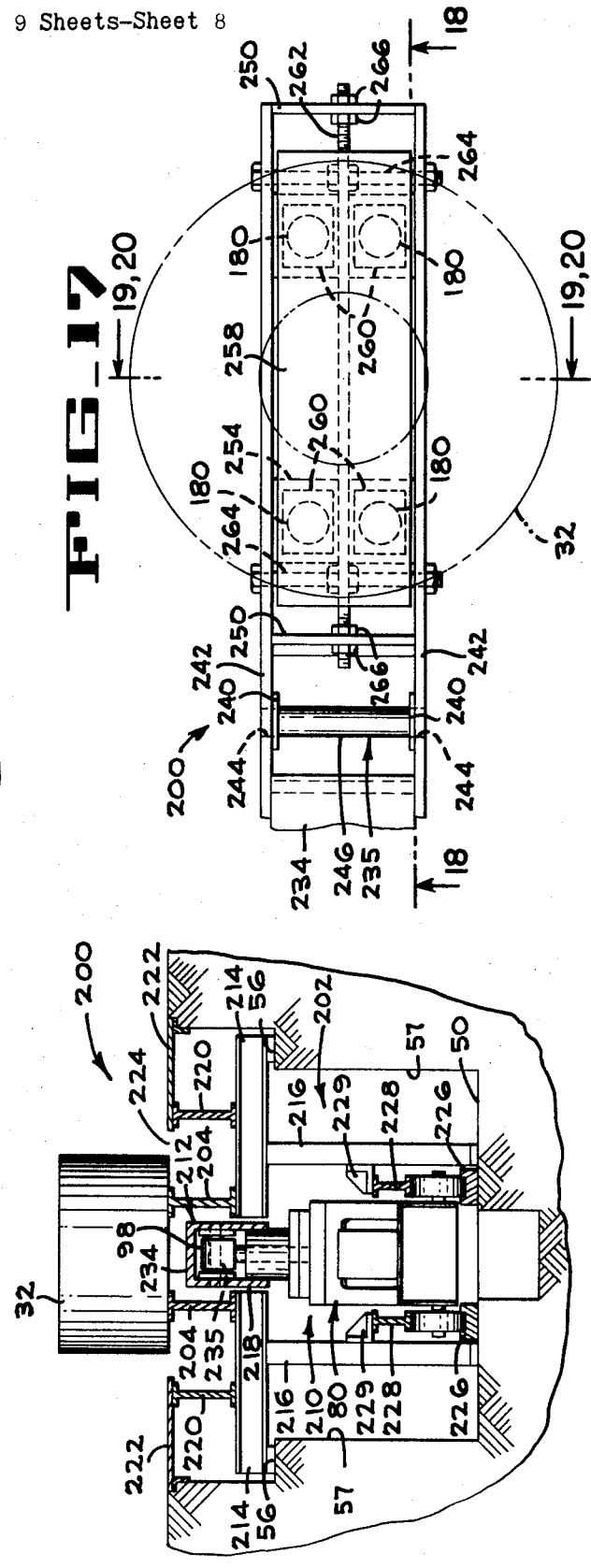

Patented June 5, 1973
3,736,997
9 Sheets-Sheet 9
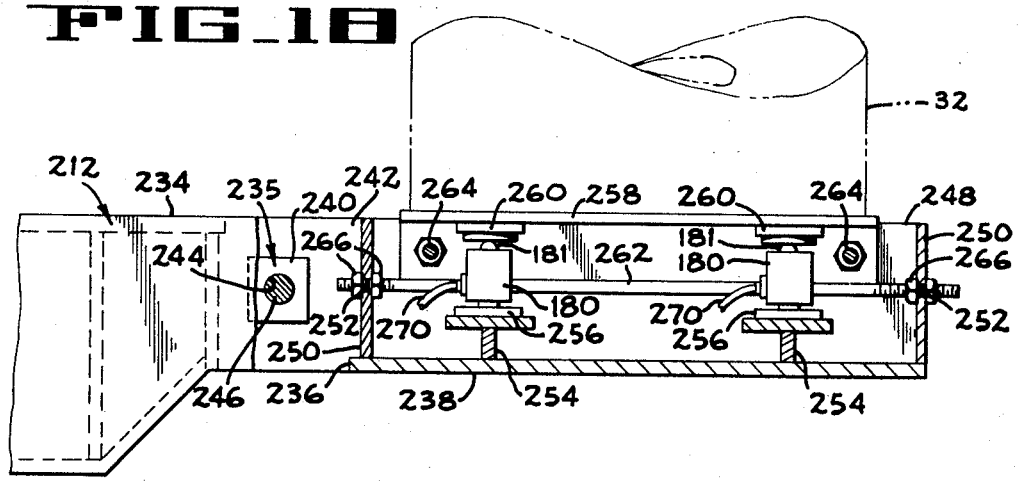
FIG_18
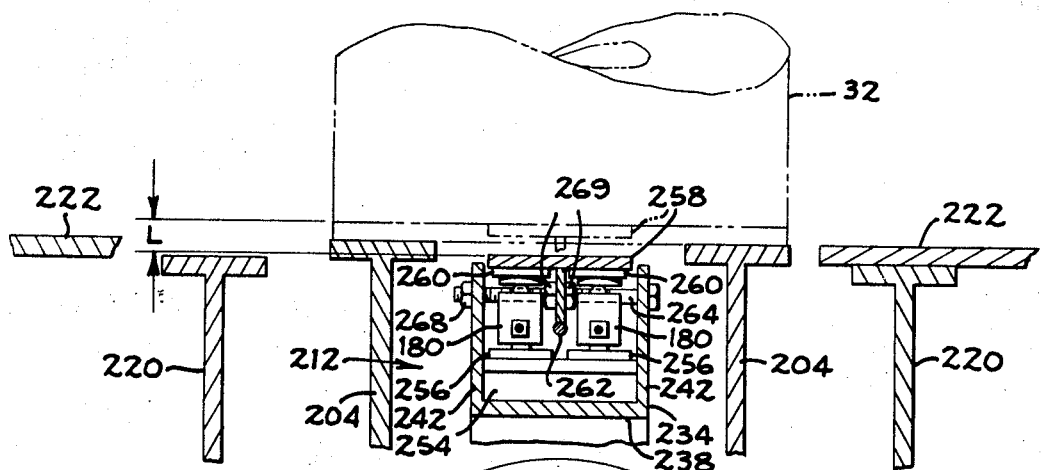
FIG_19
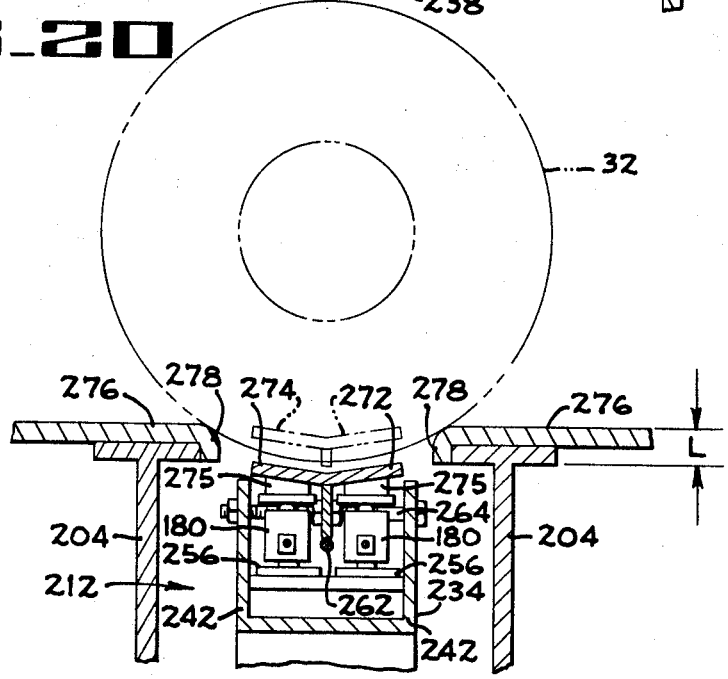
FIG_20

WALKING BEAM CONVEYOR WITH WEIGHING APPARATUS

BACKGROUND OF THE INVENTION

1. Field of the Invention

This invention relates to the conveyor art and more particularly to a walking beam type of conveyor having a hydraulically operated vertical lift and a horizontal transfer stroke with weighing means included within the conveyor structure.

2. Description of the Prior Art

Walking beam, or step-by-step reciprocating, conveyors for progressively moving an article along a linear path of travel are well known in the prior art as disclosed, for example, in the United States patents to Cartwright U.S. Pat. No. 1,742,647, to Berry U.S. Pat. No. 2,669,343 and to Manterfield U.S. Pat. No. 3,451,532. The use of hydraulic power in the operation of walking beam conveyors is also disclosed in the United States patents to Dorman et al. U.S. Pat. No. 1,941,829, to Vickers U.S. Pat. No. 1,965,868, to Drago U.S. Pat. No. 2,622,041, to Wallerius et al. U.S. Pat. No. 2,684,769 and to Manterfield U.S. Pat. No. 3,451,532. A walking beam conveyor suitable for operation in high temperature environments and having a self-contained hydraulic lift limit is disclosed in the application of Uhrich, Ser. No. 203,613, filed Dec. 1, 1971 and assigned to the same assignee as the present invention.

SUMMARY OF THE INVENTION

The walking beam conveyor of the present invention provides improvements in the movable carriage used as well as providing means for weighing the article being conveyed during the actual conveying cycle of the conveyor without requiring a transfer to some auxiliary weighing station or apparatus. The basic walking beam conveyor of this invention comprises a main stationary article supporting frame and a movable carriage. The carriage includes a raisable walking beam supported on two, wheeled trucks. Each wheeled truck has its own integral hydraulic power unit including motor, pump, valves, piping, fluid reservoir and a top flanged vertical lift cylinder. Each lift cylinder is provided with a radial guide bearing for the piston rod which is located between the cylinder and the piston rod end connection to the walking beam. The guide bearing is further supported directly to the top flange of the cylinder and the top of the truck and this prevents any lateral forces from being applied to the vertical piston rod.

In the first embodiment of the article weighing means of this invention a modified short section of the stationary article supporting frame, sufficient to support the size of the object being conveyed, is provided with a pair of vertically movable weigh beams mounted on load cells which rest on a lower part of the short section of the stationary frame. The walking beam of the carriage extends through the area occupied by the short section of the stationary support frame. When the walking beam lifts the article from its initial stationarily supported position it moves horizontally to the short section of the stationary support frame and then as the walking beam is lowered, the article is deposited on the weigh beams. The weigh beams are guided by flexure members which permit free vertical movement, but resist longitudinal or lateral movement of the weigh beams. The load cells measure only vertical forces and thus measure the weight of the article after the tare weight of the weigh beams is deducted. The carriage is returned to its starting position while the walking beam is lowered. In the next cycle of the carriage the weighed article is advanced to the main stationary support frame and the next article takes the place of the previously weighed unit on the weigh beams of the short section supporting frame. The operation is then successively repeated. Thus, the article is weighed during the actual conveying of the article without loss of motion, time or supplementary equipment.

In the alternative embodiment of the weighing means one end of the walking beam in the movable carriage is provided with a plurality of load cells and a vertically movable weigh beam. The load cells are supported within the walking beam itself and the weigh beam is mounted on top of the load cells guided by flexure members which permit free vertical movement but resist longitudinal or lateral movement of the weigh beams. The top of the weigh beam is normally elevated slightly above the top of the adjacent sideplates of the walking beam. At the start of a cycle when the walking beam is raised to lift the article from its initial stationarily supported position, the weigh beam makes first contact with the article. As soon as the article clears is stationarily supported position, the article is supported by the weigh beam which is then free to move vertically downward sufficiently for the load cells to measure the weight involved. While the walking beam is in the raised position, the carriage is advanced horizontally moving the weighed article forward. When the walking beam is then lowered, the weighed article is deposited on the main stationary support frame and the carriage is returned to its starting position. The cycle is then successively repeated and the next article takes the place of the previously weighed article on the weigh beam of the walking beam for weighing. Again in this embodiment the article is weighed during the actual conveying cycle of the article without loss of motion, time or supplementary equipment.

BRIEF DESCRIPTION OF DRAWINGS

FIG. 3 is a cross-sectional view of the weighing means of the first embodiment taken along lines 3—3 of FIG. 2 at the start of an operating cycle.

FIG. 4 is a cross-sectional view of the stationary article supporting frame of the conveyor taken along lines 4—4 of FIG. 2.

FIG. 5 is a side elevational section taken along lines 5—5 of FIG. 1 showing the carriage of the conveyor with the walking beam in its raised position (in solid lines) and showing the carriage at the end of its horizontal stroke (in dotted lines) of the operating cycle.

FIG. 6 is a side-elevational section taken along lines 6—6 of FIG. 1 showing the walking beam of the carriage of the conveyor in its lowered position at the end of its horizontal stroke (in solid lines) and showing the walking beam of the carriage in its lowered position returned to its original starting position of the operating cycle (in dotted lines).

FIG. 7 is a plan of one of the two lift truck units for the carriage.

FIG. 8 is a side elevation in section of the lift truck unit taken along lines 8—8 of FIG. 7.

FIG. 11 is a plan in one quarter section of the load cell installation taken along lines 11—11 of FIG. 10.

FIG. 12 is a side elevational section taken along lines 12—12 of FIG. 11.

FIG. 13 is a plan of the second embodiment of the weighing means of the invention.

FIG. 14 is a side elevational section taken along lines 14—14 of FIG. 13 at the start of an operating cycle.

FIG. 15 is a cross-sectional elevation taken along lines 15—15 of FIG. 14.

FIG. 16 is a side elevational section taken along lines 16—16 of FIG. 13 showing the carriage with its walking beam in the raised position during the operating cycle.

FIG. 17 is an enlarged plan of the weighing end of the walking beam of the carriage.

FIG. 18 is an enlarged side elevational section partially broken away of the weighing end of the walking beam taken along lines 18—18 of FIG. 17.

FIG. 19 is a cross-section taken along lines 19—19 of FIG. 17 showing the construction of the weighing end of the walking beam with the axis of the article being weighed vertical.

FIG. 20 is a cross-section taken along lines 20—20 of FIG. 17 showing the weighing end of the walking beam with the article being weighed having its axis horizontal and parallel to the direction of travel.

Figure 1:
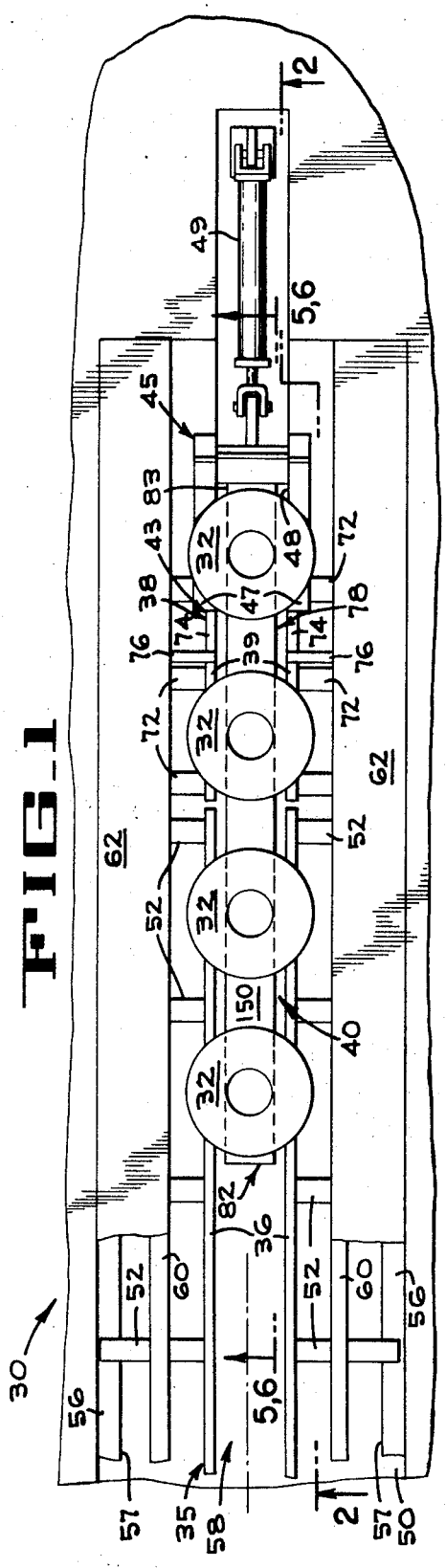
FIG. 1 is a plan of the walking beam conveyor of the invention.
Figure 2:
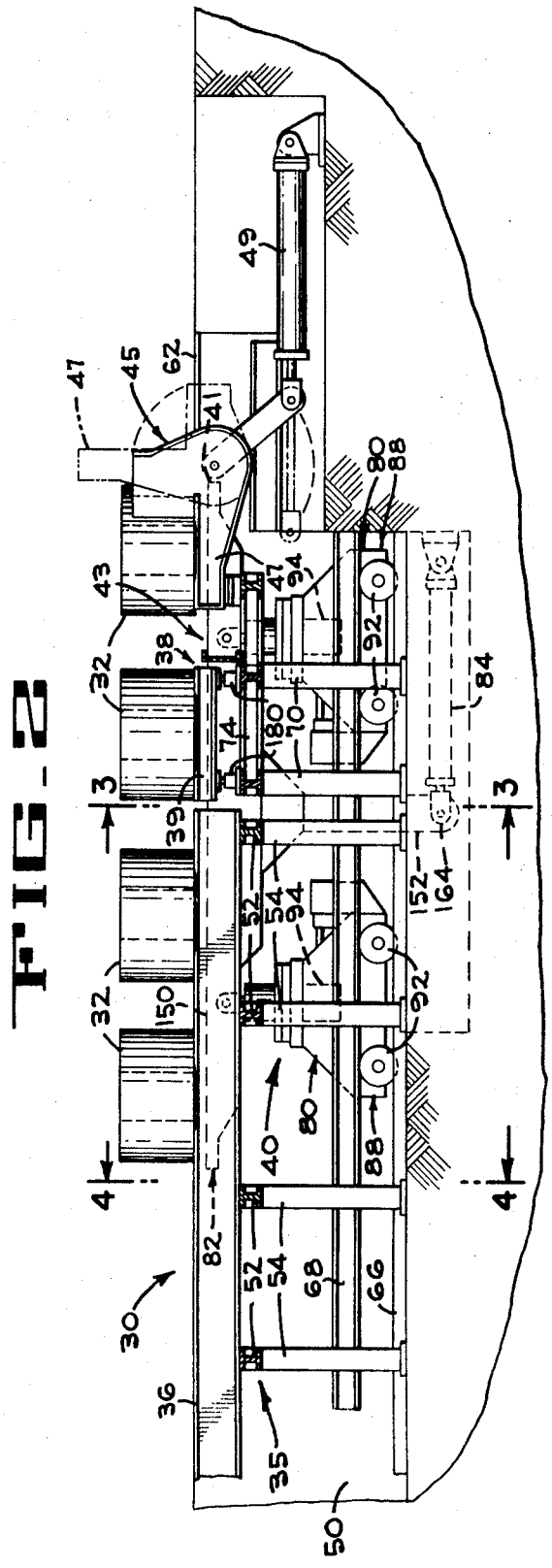
FIG. 2 is a side elevational section taken along lines 2—2 of FIG. 1.

DESCRIPTION OF THE PREFERRED EMBODIMENTS:

A walking beam conveyor 30, as shown in FIGS. 1-2, is designed to handle large heavy articles 32, such as hot coils of strip steel or aluminum, through a lift, traverse, lower and retract cycle giving a long stroke, reciprocating type of movement so as to convey the articles horizontally.

It will be understood that the conveyor 30 is capable of handling many other types of articles or of handling these articles in different positions from that shown in FIGS. 1-2 and that the movement of the articles may be varied to satisfy the requirements to which the conveyor is being put, such as the size, weight and spacing of the articles being conveyed.

The walking beam conveyor 30 of the first embodiment of this invention (FIGS. 1-12) comprises a main stationary supporting frame 35 having a pair of top longitudinal article supporting beams 36, a short stationary frame 38 having a pair of top longitudinal weigh beams 39 and a movable central carriage unit 40 located on the longitudinal center line 42 of the conveyor between the stationary top longitudinal beam 36 and extending between the top weigh beams 39. The short stationary frame 38 is located longitudinally between the main stationary frame 35 and a transfer device 45 at the feed end 43 of the conveyor 30.

The transfer device 45, such as a rotary tilter shown in FIGS. 1-2, is a conventional, known device and delivers the article or coil 32 to be handled to the feed end 43 of the conveyor. The tilter has two laterally spaced arms 47 which, in the delivery position shown in FIGS. 1-2, support the coil 32, but provide a gap 48 between these arms into which the trailing end 41 of the carriage unit 40 extends. The arms 47 are arranged so that the bottom of the coil 32 is at the same elevation as the tops of longitudinal top beams 36 and weigh beams 39. The tilter shown is provided with a pivotally mounted power cylinder 49 for rotating the arms 47 from the vertical position (shown in dotted lines in FIG. 2) to the horizontal position (shown in solid lines on FIG. 2). Other types of transfer devices may be employed to deliver the articles to the conveyor so long as provision is made for the trailing end 41 of the carriage unit 40 to extend under the article 32 so the carriage unit can pick up the article to convey it as will be described more fully hereinafter.

As illustrated in FIGS. 2-4, the conveyor 30 is preferably mounted in a concrete lined pit 50 so the coils 32 are conveyed at floor level. The main stationary frame 35 includes pairs of longitudinally spaced transverse beams 52 and pairs of spaced vertical columns 54. Columns 54 are secured to the bottom of the pit 50. Each pair of transverse beams 52 generally have one end of each beam supported on a column 54 and the other end supported on a ledge 56 on the sidewalls 57 of the pit 50 leaving a lateral opening 58 between the ends of the transverse beams adjacent the centerline 42 of the conveyor in which carriage unit 40 operates. The pair of laterally spaced longitudinal article supporting top beams 36 are attached to and supported by the transverse beams 52 adjacent the inner ends of these transverse beams. A second pair of longitudinal top beams 60 is attached to the top of transverse beams 52 outwardly of beams 36 to support a pair of floor plates 62. These floor plates 62 cover the opening in the pit 50 and extend laterally between beams 60 and the edge of the pit 50, leaving a center opening 64 between the inside edges of the floor plates slightly wider than the width of the largest article 32 to be conveyed. The floor plates 62 are supported vertically so that their top surface is generally at the same elevation as the surface of the floor adjacent pit 50. A pair of longitudinal roller tracks 66, spaced laterally from the longitudinal centerline 42 of the conveyor, are provided on the bottom of the pit adjacent columns 54. The frame 35 also includes a pair of upper longitudinal roller hold-down beams 68 which are supported from columns 54 by brackets 69 and which beams are located vertically above roller tracks 66. Both roller tracks 66 and hold-down beams 68 are parallel to the top longitudinal article supporting beams 36.

The stationary frame 38, as shown in FIGS. 2-3, is a short structural frame similar in construction to main frame 35, but having the pair of top weigh beams 39 independent of and replacing the pair of top longitudinal beams 36 of the main frame 35. However, the outer pair of longitudinal beams 60 of the main frame 35, the floor plates 62, the roller tracks 66 and the hold-down beams 68 are continuous over and supported by the short frame 38. Frame 38 includes two pairs of columns 70, three pair of lower transverse beams 72, a pair of lower longitudinal beams 74 and a pair of upper transverse beams 76. The lower transverse beams 72 are supported on columns 70 and on ledge 56 of the pit similarly to transverse beams 52. The The inner ends of three of the lower transverse beams 72, adjacent the longitudinal center line 42, are joined to one of the lower longitudinal beams 74 to form a single strong rigid unit supported by columns 70 and the ledge 56 and forming the top portions of one side of frame 38.

Figure 9:
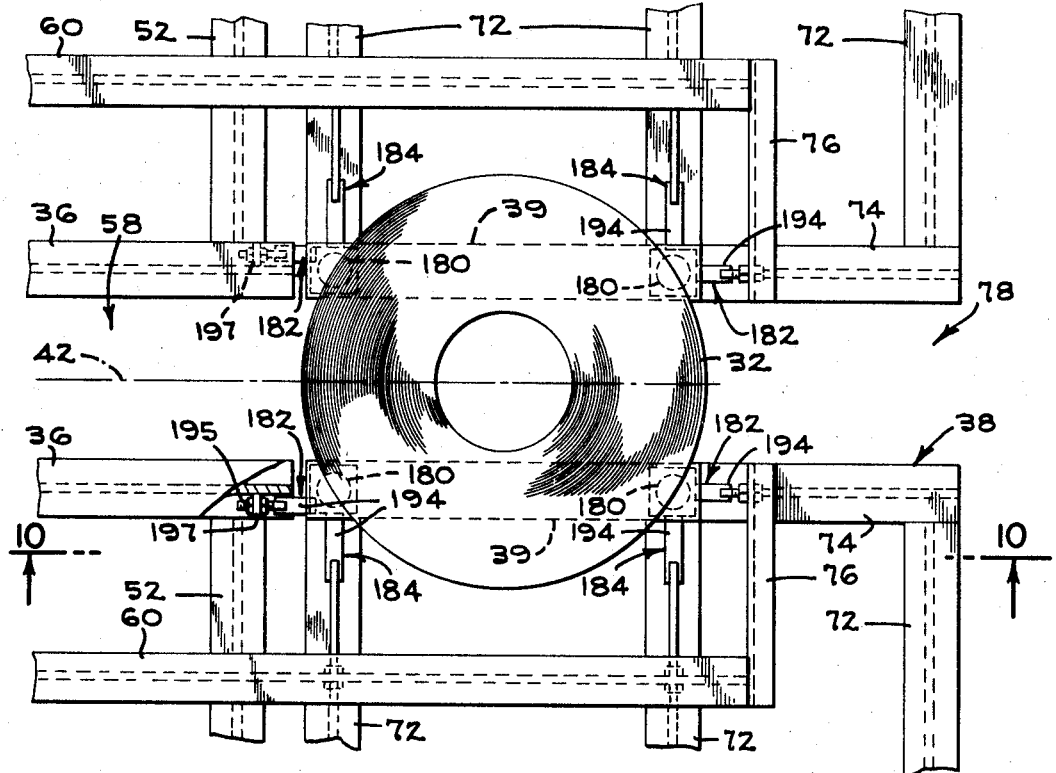
FIG. 9 is a plan of the weighing section of the first embodiment with portions broken away for clarity.
Figure 10:
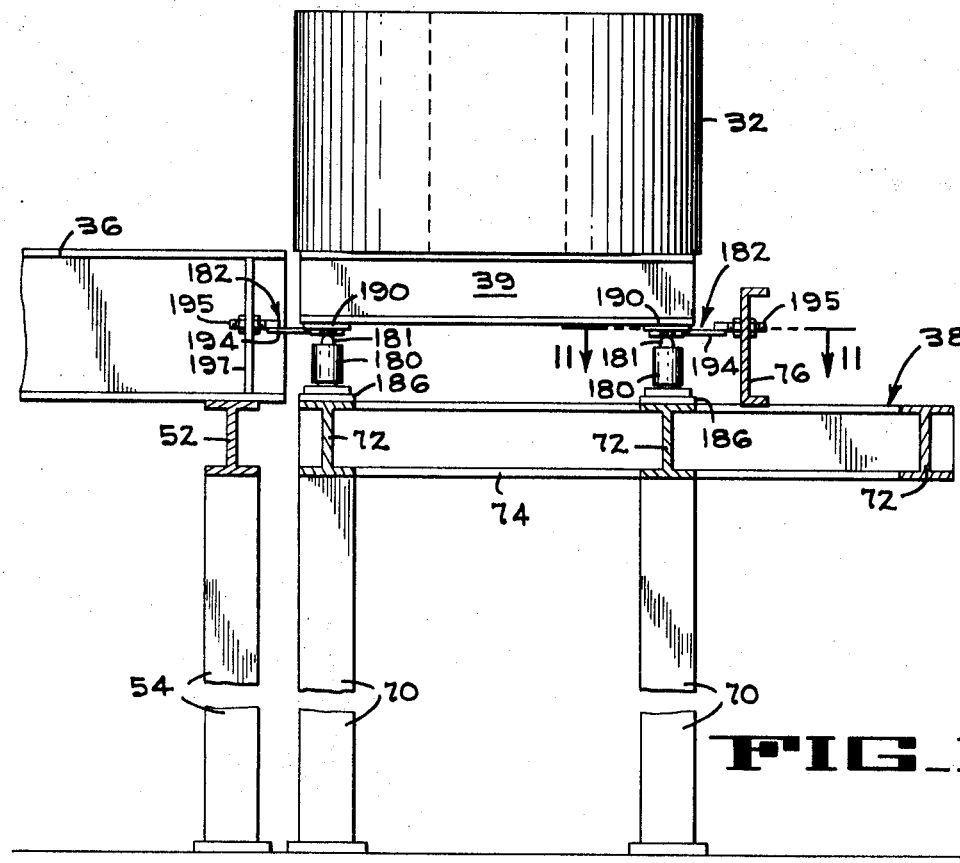
FIG. 10 is a side elevation of the weighing section of FIG. 9 taken along lines 10—10 of FIG. 9.

The inner ends of the other three lower transverse beams 72 are similarly joined to the other longitudinal beam 74 for the other side of frame 38. The lower longitudinal beams 74 are laterally spaced from the centerline 42 in vertical planes extending from beams 36 of main frame 35 but at a lower elevation which is the same as the elevation of transverse beams 72. A center lateral opening 78 between the beams 74 is thus provided in which the carriage unit operates. As shown in FIGS. 2 and 10 the lower longitudinal beams 74 extend longitudinally toward the transfer device 45 to form a support for receiving arms 47. Each of the upper transverse beams 76 is secured to and extends laterally from the top of one of the lower longitudinal beams 74 and is rigidly secured to the longitudinal end of one of the outer longitudinal beams 60. As indicated in FIG. 9, these upper transverse beams 76 are located slightly rearward of the longitudinal weigh beams 39 and adjacent the transfer device 45. The purpose of these beams 76 will be described later.

The movable central carriage unit 40, as shown in FIGS. 1–8, is located on the longitudinal centerline 42 of the conveyor and, as shown more particularly in FIGS. 3 and 4, the carriage unit is arranged to move in the vertically clear central opening 58 formed between the inner ends of transverse beams 52 and the parallel laterally spaced longitudinal article supporting beams 36 of the main frame 35, and between the similar inner ends of transverse beams 72 and the parallel laterally spaced top longitudinal weigh beams 39 and the lower longitudinal beams 74 of the short frame 38. The carriage unit 40 includes a pair of movable lift trucks 80, a relatively long walking beam unit 82 supported by the lift trucks and a power cylinder 84 to provide horizontal movement to the carriage unit.

The pair of lift truck units 80 are shown more particularly in FIGS. 7–8 and since each unit is similar, only one unit will be described. Each truck 80 comprises a main frame 88, a pair of axles 90, a pair of rollers 92 mounted on each axle 90 and a self-contained hydraulic power lift system. The hydraulic power lift system includes a self-contained hydraulic power unit 86, a vertical lift cylinder 94, a piston rod guide bearing 96 and a knuckle 98 on the end of the piston rod 95 of cylinder 94. The rollers 92 of trucks 80 ride in the roller tracks 66 and the trucks 80 are prevented from tilting upwardly by the hold-down beams 68 attached to frames 35 and 38 secured to the bottom of pit 50.

The truck frame 88 is a fabricated weldment made up primarily of a pair of main vertical sideplates 100, two end plates 102 and 103, a motor-pump support bracket 105 fitting into a cut-out portion of end plate 103, a heavy rectangular top plate 107 and interior transverse stiffeners 109. A fluid-tight tank 110, forming a hydraulic fluid reservoir, is supported within the lower part of frame 88 between axles 90 by the sideplates 100 and the stiffeners 109. Axles 90 are located transverse of the longitudinal centerline 42 and are stationarily supported in the lower part of frame 88 adjacent the longitudinal ends by reinforcing blocks 112 welded to sideplates 100. Blocks 112 have threaded holes 113 to receive set screws 114 which hold axles 90 in a fixed position transversely. Rollers 92 are rotatably mounted on the outer ends of axles 90, outside of sideplates 100, and the rollers 92 are held in place by washers 115 and cotter pins 116.

The hydraulic power unit 86 comprises the fluid reservoir 110, an electric motor M, 118, a hydraulic pump P, 120, a directional control valve $V_1$, 122, and two speed control valves $V_2$, 124. The fluid reservoir 110 contains hydraulic fluid 126. Pump 120 is provided with a suction line 128 from the reservoir 110 and a discharge line 130 to the directional control valve 122. Hydraulic valve 122 is a conventional solenoid actuated directional control valve having connections to the pump discharge, to each end of cylinder 94 and to the reservoir 110. Valves 124 are provided in each line 132 and 134 to the ends of the cylinder 94 and are conventional pressure compensated hydraulic speed control valves having bleed lines to the reservoir. Piping interconnects the cylinder 94, the reservoir 110, the hydraulic pump 120 and the hydraulic valves 122 and 124 to provide a complete, self-contained hydraulic system for controlling the raising and lowering of the walking beam unit 82.

The vertical lift cylinder 94 is a conventional double acting hydraulic power cylinder having a top flange 136 type of mounting. Top plate 107 of frame 88 has a large central hole 138 to receive the main body of cylinder 94 and a plurality of threaded holes 140 located in alignment with the holes in top flange 136 of cylinder 94. Bolts 142 secure cylinder 94 to the threaded holes 140 of top plate 107 through the top flange 136 of cylinder 94. The top end of piston rod 95 is equipped with the knuckle 98 for making a pinned connection to the walking beam 82.

Only flexible electrical cables (not shown) are necessary between a source of electrical power and the motor 118 and directional control valve 122 on the movable truck 80 so the danger of possible rupture of flexible high pressure hydraulic hoses, otherwise needed with a fixed hydraulic power unit and the movable trucks, in the usually high temperature operating environment of this equipment, is avoided. This hydraulic equipment and the fluid in the reservoir further provide additional weight in a low elevation, stable position for further helping to counterbalance the possible overhung load of an article 32 on the end of the walking beam 82 as will be described later.

One feature of this disclosure, shown best in FIG. 8, is the lateral support of vertical piston rod 95 provided by guide bearing 96. As piston rod 95 is extended in its operation any lateral forces which may be applied to the piston rod by the walking beam unit 82 are transferred to guide bearing 96, thus preventing any tendency to bend the rod and any tendency for premature failure of piston rod seal 144 in cylinder 94 due to such rod bending. Guide bearing 96 is a flanged bearing unit having a bushing 146. This bushing 146 may be of the self-lubricating type, such as a bronze bushing with internal plugs of graphite, or a bronze bushing equipped for lubrication by a suitable high temperature grease to provide a low friction, close-fitting guiding surface for the piston rod. Guide bearing 96 is mounted on top of the mounting flange 136 of cylinder 94 with an annular spacer member 148 located in between the guide bearing 96 and the cylinder flange 136. Bolts 142, which pass through the flange of the guide bearing 96, the annular spacer 148 and the cylinder flange 136 secure these parts to the top plate 107 of the truck frame 88 in a manner so that the longitudinal axis of the bore of bushing 146 is coaxial with the axis of movable piston rod 95.

The walking beam unit 82 comprises an elongated fabricated structural beam member 150, a vertical strut 152, and a pair of pin connection 154. Beam member 150 has an inverted U-shaped cross-section of varying depth to suit the structural characteristics needed and has a horizontal length sufficient to hold a plurality of the coils 32 at the particular spacing required for the given installation. The vertical strut 152 is rigidly attached to and extends downwardly from the central portion of beam member 150 to provide a lower connection to the horizontal stroke power cylinder 84. At about midway between strut 152 and the longitudinal ends of beam member 150, the pin connections 154 are provided on the underside of beam member 150 for attaching the knuckle 98 of each lift cylinder 94 to the beam member 150 so the walking beam unit 82 is supported by the two lift trucks 80.

The lower end of strut 152 contains a transverse hole 156 and a pin 158 therethrough. As indicated in FIGS. 3, 5–6, the horizontal stroke power cylinder 84 is located in the bottom of pit 50 on the longitudinal centerline 42 of the conveyor below the level of roller tracks 66. Power cylinder 84 is a conventional double acting hydraulic power cylinder having an end pivoted mounting 160 attached to mounting bracket 162 which is attached to the lower-most portion of pit 50. Cylinder 84 has a relatively long stroke, frequently 10 or 12 feet, equal to the required spacing of the coils 32 on the walking beam unit 82. A clevis 164 is attached to the end of the piston rod 166 of cylinder 84. Pin 158 pivotally connects clevis 164 on the end of piston rod 166 and the lower end of strut 152 so that motion of piston rod 166 provides the horizontal motion for carriage 40. A conventional stationary dydraulic power unit (not shown) provides the hydraulic fluid under pressure for operation of power cylinder 84 since this cylinder is not subject to horizontal travel similar to the vertical lift cylinders 94. A self-contained hydraulic power unit and cylinder may be used if desired however.

The connection 154 of the vertical lift cylinders 94 to the beam member 150 is shown in FIGS. 3 and 5. A pair of reinforcing plates 168 is welded to the inside of the vertical legs or sideplates 170 of the U-shaped beam member 150 at each point of connection to lift trucks 80. A horizontal hole 172 is provided transversely through the vertical legs 170 and reinforcing plates 168. Horizontal pin 174 is fitted through transverse hole 172 and knuckle 98 on piston rod 95 to make a pinned connection of the vertical lift cylinder 94 to the walking beam member 150. The second lift cylinder 94 is connected to the walking beam member 150 in a similar manner but spaced longitudinally therefrom. With the connection of walking beam unit 82 to the two lift cylinders 94 on trucks 80 and the connection of vertical strut 152 to the horizontal stroke power cylinder 84, the assembly of movable carriage unit 40 is complete.

As illustrated more particularly in FIGS. 9–12, the means for weighing the articles 32 will now be described. A plurality of strain gage load cells 180, such as commercially manufactured by the Revere Electronic Division of Neptune Meter Company, Wallingford, Connecticut, 16492, U.S.A., and known as Type CSP-CP-CGP load cells having a capacity of 10,000 to 50,000 pounds capacity, are used to measure the vertical loads imposed upon the cells by the weight of the article 32. These load cells are base mounted units having a movable plunger with a hemi-spherically shaped upper end and contact point 181. As shown in FIGS. 9–10 a group of four load cells 180 is mounted on lower longitudinal beams 74 of frame 38 and the pair of top longitudinal weigh beams 39 are then supported on the top of the load cells 180. When the article, or coil, 32 is placed on top of weigh beams 39, the coil is uniformly supported by the pair of weigh beams 39 and the group of load cells 180 thereunder.

For accurate measurement only vertical loads must be applied to the load cells 180 and all lateral and longitudinal forces or thrust must be prevented from reaching the load cells. For this reason, special flexure members or check plates 182 and 184 are used in the mounting of the load cells 180 as shown in FIGS. 9–12. These flexure members 182 and 184 are flexible in the vertical plane to permit free vertical movement, but are stiff in the horizontal plane to resist axial movement in the direction of the long axis of the member. Thus, the flexure member 182 is provided at the top of each load cell 180 to resist longitudinal movement of the weigh beams 39 parallel to the longitudinal centerline 42 of the conveyor and the flexure member 184 is provided to resist lateral or transverse movement of the weigh beams 39 perpendicular to the longitudinal centerline.

Since the mounting arrangement of the load cells 180 under each top weigh beam 39 is similar, only one mounting arrangement, as shown in FIGS. 11 and 12, will now be described. A bottom plate member 186 is removably attached to the top of lower longitudinal beam 74. The bottom of one load cell 180 is removably fastened to a bottom hardened steel plate member 188 so the load cell is mounted vertically and then hardened plate member 188 is removably fastened to the bottom plate member 186 securing the load cell to the short stationary frame 38. An upper plate member 190 is rigidly secured, as by welding, to the bottom of weigh beam 39 adjacent one end of this beam. A top hardened steel plate member 192 is removably fastened to the underside of upper plate member 190. The underside of this top hardened steel plate member 192 then contacts the hemi-spherical end portion 181 of load cell 180 when the weigh beam is finally assembled on the load cell as shown in FIG. 12.

Each of the flexure members 182 and 184 include a flat flexible bar portion 194 and a threaded rod portion 195 secured to the bar portion 194, as by welding. A pair of nuts 196 mounted in the threaded rod portion 195 adjustably secure and lock the threaded rod portion 195 to a portion of the fixed or stationary structure. As shown in FIGS. 11 and 12, the threaded rod portion 195 of the longitudinal flexure member 182, adjacent the transfer device 45, is adjustably secured to the web portion of the upper transverse member 76. The flexible bar portion 194 of the other end of flexure member 182 is rigidly secured to upper plate member 190, as by welding. At the opposite longitudinal end of weigh beam 39, the threaded rod portion 195 of a second flexure member 182, is adjustably fastened to a short bar 197 vertically secured to the web portion of one of the inner longitudinal beams 36 of the main fixed frame 35 as indicated in the cutaway portion of FIG. 9. The flexible bar portion 194 of the second flexure member 182 is rigidly secured to a second upper plate member 190, as by welding, attached to the other end of weigh beam 39. The transverse flexure members 184 have their threaded end portions 195 adjustably fastened to the web portion of outer longitudinal beams 60 which are secured to frame 38 and have their flexible bar portions 194 rigidly secured to upper plate members 190, as by welding, at a location perpendicular to that of longitudinal flexure members 182. Thus, each end of weigh beam 39 is secured to a stationary structure, frames 35 and 38, by flexure members 182 and 184 perpendicular to each other. When the load cells 180 and the weigh beams 39 are finally assembled, the nuts 196 on threaded rod ends 195 are drawn tight to lock the weigh beams 39 in a longitudinal and transverse direction in a fixed position horizontally but the flexible bar portions 194 of the flexure members permit free vertical movement of these beams so the load cells 180 can measure the weight imposed on the weigh beams 39.

Electrical wires 198 are connected to terminals on each of the load cells 180 and to a remote instrument (not shown) for indicating and/or recording the weight measured by the load cells.

In the normal operation of this walking beam conveyor 30, the movable carriage unit 40 operates in a four step cycle. In the starting position (FIG. 2) the walking beam unit 82 is in a lowered retracted position close to the transfer device 45 with the top of the walking beam member 150 a few inches below the elevation of the top of the longitudinal beams 36 of the stationary supporting frame 35 and the weigh beams 39 of frame 38. The article 32 is supported by the arms 47 of the transfer device 45 at this time. In the first step, the walking beam unit 82 of the carriage 40 is raised (FIG. 5) by the lift cylinders 94. As the walking beam unit 82 is raised, the trailing end 83 makes contact with the bottom of the article 32 and raises it a few inches above the elevation of the top of longitudinal article supporting beams 36, weigh beams 39 and arms 47 thus supporting the article 32 free and clear of arms 47. In the second step (FIG. 5) the carriage unit 40 is moved horizontally forward, while raised, by the horizontal stroke cylinder 84 thus conveying article 32 forward with the carriage unit 40. In the third step (FIG. 6) the walking beam unit 82 is lowered below the elevation of the top of longitudinal beams 36 and weigh beams 39. During this lowering of walking beam unit 82 the first article 32 is deposited on the top of the weigh beams 39 (FIG. 3) where it is then weighed. In the fourth and final step of the cycle, (FIG. 6) the carriage unit 40 is moved horizontally rearward toward the transfer device 45 to return to its starting position. The carriage unit 40 is then in a position ready to repeat its cycle and convey a second article 32. As the cycles are repeated, the carriage unit 40 conveys the first article 32 forward a distance equal to the horizontal stroke of cylinder 84 during each cycle until the length of the walking beam unit 82 is occupied with longitudinally spaced articles. During the next following cycle, the first article to be received is then discharged from the walking beam unit at its forward end 85 while another article 32 is picked up at the trailing end 83 of the walking beam unit.

At the start of the operation of conveyor 30 only one article 32 will be supported on carriage unit 40 and walking beam unit 82 and, as indicated on FIG. 5, this first article will normally be on the trailing end 83 extending beyond the rear truck 80. This condition may also occur at the completion of operation of the conveyor with a single coil on the forward end 85 of the walking beam unit. Due to the heavy construction required for the carriage unit and the long longitudinal spacing normally provided between trucks 80, the dead weight of the two lift trucks 80 and the walking beam unit 82 will generally be sufficient to provide adequate stability of carriage 40 against an overturning moment with the single coil on the outer end of the walking beam unit 82. The inclusion of the self-contained hydraulic power unit 86 within each of trucks 80 as described previously, adds to the low center of gravity of these trucks and further assists in counterbalancing the possible overturning moment. Hold-down beams 68 act as a safety device to prevent any accidental tilting of trucks 80 by restraining rollers 92 against uplift. Counterweight can be added to trucks 80, if necessary under special conditions, to insure stable operation of trucks 80 and carriage unit 40, but as mentioned above should normally not be required.

The walking beam conveyor 200 of the second embodiment of this invention (FIGS. 13–20) is similar to the first embodiment (FIG. 1–12) in that it comprises a main stationary frame 202 having a pair of top longitudinal article supporting beams 204 laterally spaced from a longitudinal centerline 206, and a movable central carriage unit 210 having a walking beam unit 212 located on the longitudinal centerline 206 of the conveyor between the stationary top longitudinal beams 204. However, in this embodiment there is no short stationary frame. The main stationary frame 202 and the movable carriage unit 210 extend to the transfer device 45 and the weighing of articles 32 is accomplished within the weigh beam unit 212 of the carriage unit 210.

As illustrated in FIGS. 14–16, the conveyor 200 is preferably mounted in a concrete lined pit 50 so the coils 32 are conveyed at floor level. The main stationary frame 202 includes pairs of longitudinally spaced transverse beams 214, and pairs of longitudinally spaced columns 216 which are secured to the bottom of pit 50. The transverse beams 214 generally have one end supported on columns 216 and the other end supported on a ledge 56 of the sidewalls 57 of the pit 50, leaving a center opening 218 between the ends of the transverse beams 214 adjacent the centerline 206 of the conveyor 200. This frame 202 supports the pair of laterally spaced longitudinal article supporting top beams 204 adjacent the inner ends of transverse beams 214. A second pair of longitudinal top beams 220 may be provided on the top of transverse beams 214 outwardly of top beams 204 to support a pair of floor plates 222. These floor plates 222 cover the opening in the pit 50 and extend laterally between beams 220 and the edge of the pit 50, leaving a center opening 224 between the inside edges of the pair of floor plates 222 slightly wider than the width of the largest article 32 to be conveyed. The floor plates 222 are supported vertically so that their top surface is generally at the same elevation as the surface of the floor adjacent pit 50. A pair of longitudinal roller tracks 226, spaced laterally from the longitudinal centerline 206 of the conveyor, are provided on the bottom of the pit adjacent columns 216. The frame 202 also includes a pair of upper longitudinal roller hold-down beams 228 which are supported from columns 216 by brackets 229 and which beams are located vertically above roller tracks 226. Both roller tracks 226 and hold-down beams 228 are parallel to the top of longitudinal article supporting beams 204. As shown in FIG. 14, a pair of lower longitudinal beams 230 may extend longitudinally beyond the first pair of columns 216 and be joined to transverse beams 214 to form a support for receiving arms 47 of the tilter 45.

The movable carriage unit 210 is similar to carriage unit 40 of the first embodiment having a pair of lift trucks 80, a walking beam unit 212 and a horizontal stroke power cylinder 84. The pair of lift trucks 80 are connected to and movably support the walking beam unit 212 in the same manner as previously described. The walking beam unit 212 comprises a vertical strut 232, an elongated fabricated structural beam member 234 and a pair of pin connections 235. The beam member 234 is modified slightly from beam member 150 as will be described more fully later. The vertical strut 232 extends downwardly from beam member 234 and connects to the power cylinder 84 as previously described for strut 152 to provide horizontal motion for carriage 210. The lift trucks 80 ride in the roller tracks 226 and are restrained from tilting by the hold-down beams 228.

The modified beam member 234 has a generally rectangular box-shaped cross-section of varying depth to suit the structural characteristics needed except at one end portion where the cross-section becomes U-shaped. Beam member 234 has a length sufficient to hold a plurality of the coils 32 at the longitudinal spacing of the articles required for the given installation. The vertical strut 232 is attached to beam member 234 at about its midpoint similarly to strut 152 on beam member 150 and for the same purpose. At about midway between vertical strut 232 and the longitudinal ends of beam member 234 pin connections 235 are provided for attaching knuckle 98 of each vertical cylinder 94 to the walking beam unit 212. An opening 236 is provided in the bottom plate 238 of beam 234 at the connection points 235 for the vertical passage of the knuckle 98 and piston rod 95. A pair of reinforcing plates 240 is attached as by welding to the vertical sideplates 242 of beam member 234 and a horizontal hole 244 is provided transversely through reinforcing plates 240 and vertical sideplates 242. A pin 246 completes the connections 235 between the beam member 234 and the knuckle 98 at each connection 235 of the vertical lift cylinders 94 to the walking beam unit 212.

As illustrated more particularly in FIGS. 16–19, the means of weighing the articles 32, in this second embodiment of the invention, will now be described. At the trailing end portion 248 of the beam member 234 the box construction of the rest of the beam member is modified to a U-shaped section extending over a length slightly greater than the length of the largest article 32 to be handled. This U-shaped end section has an open top, but includes bottom plate 238 and vertical sideplates 242. A pair of vertical transverse plates 250 having a central hole 252 connect the vertical sideplates 242, one plate 250 being located adjacent the trailing end lift cylinder connection 235 and the other plate 250 being located at the extreme outer end of beam member 234. A pair of T-shaped beams 254 extend transversely between sideplates 242 and are welded thereto and are further welded to bottom plate 238. Beams 254 are spaced longitudinally at about one quarter of the distance between transverse plates 250 inwardly from each of these plates 250.

As shown in FIG. 17 a group of four base mounted strain gage load cells 180, as used and described in the first embodiment of this invention, is used to measure the vertical loads upon the load cells imposed by the weight of article or coil 32. The bottom of each load cell 180 is removably fastened to a bottom hardened steel plate member 256. Member 256 is also removably fastened to the horizontal top leg of one of the transverse T-shaped beams 254. A T-shaped longitudinal weigh beam 258 is located along the longitudinal centerline 206 of the conveyor with the horizontal legs of beam 258 located above the group of four load cells. A top hardened steel plate member 260 is removably attached to the horizontal legs or flanges of the T-shaped weigh beam 258 at a location directly over each load cell 180 so that the hemi-spherical movable end portion 181 of the load cell contacts the center portion of each hardened top plate 260. The height of transverse beams 254 is selected in conjunction with the overall height of the load cell 180, the thickness of plates 256 and 260, and the thickness of the horizontal flange of weigh beam 258 so that the top of the weigh beam 258 when assembled in operating position on the load cells 180 is slightly above the top edges of vertical sideplates 242 of beam member 234 as indicated in FIGS. 18 and 19. The vertical lift L of the walking beam unit 212 with its weigh beam 258 is indicated in FIG. 19. In order to prevent longitudinal and lateral forces from reaching the load cells 180 and thereby affecting the accuracy of the load cells, the T-shaped weigh beam 258 is anchored both longitudinally and laterally by flexure members 262 and 264. Longitudinal flexure member 262 may be a relatively small diameter rod threaded on both ends and having a length sufficient to extend between transverse plates 250. The central portion of rod 262 is attached to the bottom of the vertical leg of weigh beam 258 as by welding. The threaded ends of rod 262 pass through the central holes 252 in plates 250 and nuts 266 on each side of plates 250 serve to position, tighten and lock flexure member 262, and thereby weigh beam 258, in the longitudinal direction. As indicated in FIG. 18, a pair of lateral flexure members 264 is used and each is located between the longitudinal ends of weigh beam 258 and the load cells 180. Lateral flexure members 264 may be relatively small diameter bolts threaded over most of their length. The members 264 extend transversely through vertical sideplates 242 of beam member 234, passing through the vertical leg of the T-shaped weigh beam 258. Nuts 268 lock lateral members 264 to the vertical sideplates 242 of beam member 234 and nuts 269 serve to centrally position and lock weigh beam 258 laterally to the lateral member 264. The flexure members 262 and 264 are selected to provide free vertical movement while being stiff axially. These members 262 and 264 may also be constructed similarly to flexure members 182 and 184, described in the first embodiment, with a flexible flat bar portion and a threaded portion. Electrical wires 270 are connected to terminals on each of load cells 180 and to remote instrument (not shown) for indicating and/or recording the weight measured by the load cells.

It is to be noted that coils 32 may also be handled by this invention when their axis is horizontal and parallel to the longitudinal axis of the conveyor as shown in FIG. 20. In this case weigh beam 272 is modified slightly from weigh beam 258 by inclining the top flanges 274 and adding tapered filler blocks 275 underneath these flanges so as to form a concave pocket, with its axis parallel to the longitudinal axis of the conveyor, for the curved surface of the cylindrical coil to rest in. Floor plates 276 are also modified slightly from floor plates 220 by providing a rolled flange 278 on the edge adjacent the conveyor centerline to eliminate the sharp corner of the inner edges of floor plates 220 when handling the coils in the horizontal position. The vertical lift L of the walking beam unit 212 and weigh beam 272 is indicated on FIG. 20.

In a similar manner the coils may be handled in the conveyor of this invention when the axis of the coil is horizontal but transverse to the longitudinal centerline of the conveyor (not shown). In this case weigh beam 272 would be slightly modified by the addition of pairs of spaced tapered blocks secured to the top flanges of weigh beam 272 to form a concave pocket whose axis is transverse to the longitudinal axis of the weigh beam and each pair is spaced apart longitudinally by the desired spacing of the coils. Additional pairs of tapered blocks would also be added to the stationary top longitudinal article supporting beams 204 at the desired spacing of the coils to prevent the coils 32 from rolling. The vertical lift L of the walking beam unit 212 would have to be sufficient for the coils to be lifted above the top of these tapered blocks before moving horizontally.

The normal operation of the walking beam conveyor of this second embodiment of the invention, is similar to the description previously given for the conveyor 30 of the first embodiment except as will be noted from the following description. As shown in FIG. 14 for the starting position, the walking beam unit 212 is in a lowered retracted position close to the transfer device 45 with the top of beam member 234 a few inches below the elevation of the top of the top longitudinal article supporting beams 204 of the main stationary frame 202 and the coil supporting arms 47 of the transfer device 45. It is to be noted that the top of the T-shaped weigh beam 258, supported in beam member 234, extends slightly above the top edges of the vertical sideplates 242 of the beam member 234. As the walking beam unit 212 is raised by the lift cylinders 94 (FIG. 16) the weigh beam 258 makes contact with the bottom of the coil 32 resting in the arms 47 of the transfer device 45 and raises the coil a few inches above the elevation of the top of the longitudinal article supporting beams 204 thus supporting the coil 32 free and clear of arms 47. Since coil 32 is not supported on weigh beam 258, incorporated as part of beam member 234, the coil 32 will then be weighed. In the second step the carriage unit 210 is moved horizontally forward, while in the raised position, by the horizontal stroke cylinder 84 thus conveying coil 32 forward with the carriage unit 210. In the third step, the walking beam unit 212 is lowered below the elevation of the top of the longitudinal article supporting beams 204. During this lowering of walking beam unit 212 the first coil 32 is deposited on the top of the stationary article supporting beams 204 (FIG. 15) of main stationary frame 202. In the fourth and final step the carriage unit 210 is moved horizontally rearward toward the transfer device 45 while the walking beam unit 212 is lowered, to return to its starting position. The carriage unit 210 is then in a position to repeat its cycle and convey a second article 32. As the cycles are repeated, the carriage unit 210 conveys the first article 32 forward a distance equal to the horizontal stroke of cylinder 84 during each cycle unit the length of the walking beam unit 212 is occupied with longitudinally spaced articles 32. During the next following cycle the first article to be received is then discharged from the walking beam at its forward end while another article 32 is being picked up at the trailing or feed end of the conveyor. Thus, weighing of an article 32 is accomplished while the article is on the walking beam unit 212 itself and the short stationary weigh frame 38 of the first embodiment is eliminated.

Although the best mode contemplated for carrying out the present invention has been herein shown and described, it will be apparent that modifications and variations may be made without departing from what is regarded to be the subject matter of this invention.

I claim:

1. In a walking beam conveyor for step-by-step advance of an article received thereon, said conveyor having a first member and a second member to support the article alternately and having means to effect advancing and retracting movement in successive cycles of one of said members, said one member advancing above the other member to carry the article thereover and dropping below said other member before retraction to deposit the article thereon, whereby the article is advanced in steps, the improvement comprising means on said one member to indicate the weight of the article thereon when the article is supported solely by said member.

2. In a walking beam conveyor for step-by-step advance of an article received thereon, said conveyor having a first member and a second member to support the article alternately and having means to effect advancing and retracting movement in successive cycles of one of said members, said one member advancing above the other member to carry the article thereover and dropping below said other member before retraction to deposit the article thereon, whereby the article is advanced in steps, the improvement comprising means on said other member to indicate the weight of the article thereon when the article is supported solely by said member 3. In a walking beam conveyor for step-by-step advance of an article received thereon, said conveyor having a first member and a second member to support the article alternately and having means to effect advancing and retracting movement in successive cycles of at least one of said members, said one member advancing above the other member to carry the article thereover and dropping below said other member before retraction to deposit the article thereon, whereby the article is advanced in steps, the improvement comprising means on one of said members to indicate the weight of the article when the article is supported solely by said member.

4. The apparatus of claim 1 wherein said means on one of said members to indicate the weight of the article includes a load cell.

5. The apparatus of claim 4 including means to confine the force on said load cell to a vertical force from said article.

6. A walking beam conveyor for conveying articles with means for weighing the articles comprising in combination:

a. an elongated stationary support frame having a stationary surface for supporting the articles to be conveyed;

b. a movable carriage including a vertically movable elongated walking beam unit having an article engaging surface, said walking beam unit supported on said carriage;

c. hydraulic power means for raising and lowering said walking beam unit from a position in which the article engaging surface is disposed below the level of the stationary surface to a position in which the article engaging surface is above said stationary surface;

d. hydraulic power means connected to said carriage for moving said carriage horizontally; and e. weighing means having an article engaging surface disposed above the stationary surface of said support frame for receiving the articles to be weighed after said walking beam unit has lifted the articles above the level of said stationary surface.

7. The walking beam conveyor of claim 6 wherein the weighing means comprises a plurality of load cells.

8. The walking beam conveyor of claim 6 wherein the hydraulic power means for raising and lowering said walking beam unit is located within said carriage and is a self-contained hydraulic system including an electric motor, a pump, a fluid reservoir, a remotely operated control valve, interconnecting fluid lines and at least one vertical lift hydraulic power cylinder connected to said walking beam unit and supported by said carriage.

9. The walking beam conveyor of claim 8 further comprising a guide bearing radially supporting the piston rod of said vertical lift cylinder, said guide bearing supported on said vertical lift cylinder in axial alignment with the axis of the piston rod of said vertical lift cylinder and said guide bearing located between said cylinder and the connection of the piston rod to said walking beam unit whereby said guide bearing prevents lateral forces from being applied to or causing bending in the piston rod of said vertical lift cylinder.

10. A walking beam conveyor for conveying articles with means for weighing the articles comprising in combination:

a. an elongated stationary support frame having a stationary surface for supporting the articles to be conveyed;

b. a horizontally movable carriage including a pair of wheeled trucks and a vertically movable elongated walking beam unit mounted on said trucks, said walking beam unit having an article engaging surface movable between a position disposed below said stationary surface to a position above said stationary surface for lifting the articles off said stationary surface of said supporting frame;

c. a self-contained hydraulic power lift system carried by each of said trucks for raising and lowering of said walking beam unit;

d. hydraulic power means connected to said carriage for moving said carriage horizontally; and e. load cell weighing means mounted on a section of said stationary support frame, said weighing means including at least one weigh beam having a top surface disposed above said stationary surface of said supporting frame for receiving the articles to be weighed, said weighing means located in the path of travel of said movable walking beam unit so that the articles are lifted and moved to the weighing means by said walking beam unit and when said walking beam unit is lowered the articles are deposited onto the weigh beam for weighing.

11. The walking beam conveyor of claim 10 wherein the load cell weighing means includes a plurality of load cells, each of said load cells is attached at its bottom portion to a lower hardened steel plate member secured to said section of said stationary support frame and the top of the movable portion of each load cell engages an upper hardened steel plate member secured to the bottom of said weigh beam.

12. The walking beam conveyor of claim 11 wherein said weigh beam is further provided with a plurality of flexure members, at least one flexure member being positioned in a longitudinal direction of the conveyor and at least one flexure member being positioned in a transverse direction of the conveyor, one end of each flexure member being connected to said weigh beam and the opposite end connected to said stationary support frame, said flexure members permitting free vertical movement of said weigh beam but restraining said weigh beam in the longitudinal and transverse directions.

13. The walking beam conveyor of claim 10 wherein the self-contained hydraulic power lift system includes a vertical hydraulic power cylinder supported by said truck and having a piston rod connected to said walking beam unit, a fluid reservoir, an electric motor, a pump, a remotely operated control valve and interconnecting fluid lines mounted on said truck.

14. The walking beam conveyor of claim 13 wherein said vertical power cylinder is further provided with a guide bearing radially supporting said piston rod, said guide bearing being located between said cylinder and said piston rod connection to said walking beam unit and said guide bearing being supported by said truck with the axis of said bearing in axial alignment with the vertical axis of said piston rod.

15. A walking beam conveyor for conveying articles with means for weighing the articles comprising in combination:

a. an elongated stationary support frame having a stationary surface for supporting the articles to be conveyed;

b. a horizontally movable carriage including a pair of wheeled trucks and a vertically movable elongated walking beam unit mounted on said trucks, said walking beam unit movable between a position disposed below said stationary surface of said support frame and a position disposed above said stationary surface for lifting the articles off said supporting frame;

c. a self-contained hydraulic power lift system carried by each of said trucks for raising and lowering of said walking beam unit;

d. hydraulic power means connected to said carriage for moving said carriage horizontally; and e. load cell weighing means mounted within one end of said walking beam unit, said weighing means including a weigh beam having a top surface disposed above the top of said walking beam unit, said top surface receiving the article to be weighed after said walking beam unit has lifted the article above the level of said stationary surface of said support frame.

16. The walking beam conveyor of claim 15 wherein the self-contained hydraulic power lift system comprises an electric motor, a pump, a fluid reservoir, a remotely operated control valve, interconnecting fluid lines, and a vertical lift cylinder, said lift cylinder connected to said walking beam unit.

17. The walking beam conveyor of claim 16 further comprising a guide bearing radially supporting the piston rod of said vertical lift cylinder, on each of said trucks, said guide bearing supported on said truck with the axis of said bearing in axial alignment with the vertical axis of the piston rod of said vertical lift cylinder and said guide bearing located between said cylinder and the connection of the piston rod to said walking beam unit whereby said guide bearing prevents any lateral force from being applied to or causing bending in the piston rod of said vertical lift cylinder.

18. The walking beam conveyor of claim 15 wherein said walking beam unit further comprises an elongated structural beam member having an open top, U-shaped section at one end and said load cell weighing means is mounted within said U-shaped end section, said U-shaped end section having a length greater than the length of the largest article to be weighed and having at least one transverse plate member at each end of said end section rigidly secured to the vertical legs of said U-shaped end section of said beam member.

19. The walking beam conveyor of claim 18 wherein said weighing means comprises a plurality of load cells and said weigh beam is supported on said load cells, the longitudinal length of said weigh beam being at least equal to the length of the largest article to be weighed and the top of said weigh beam is disposed slightly above the top of the vertical legs of said U-shaped end section of said walking beam member.

20. The walking beam conveyor of claim 19 wherein the bottom of each load cell is attached to a bottom hardened steel plate member secured to the lower part of said U-shaped end section of said walking beam member and the top of each load cell engages a top hardened steel plate member secured to said weigh beam.

21. The walking beam conveyor of claim 19 wherein said weigh beam is a T-shaped member, and said T-shaped weigh beam is equipped with a plurality of flexure members to restrain the weigh beam in the lateral and longitudinal directions but to permit free vertical movement.

22. The walking beam conveyor of claim 21 wherein said plurality of flexure members includes a longitudinal flexure member, said longitudinal flexure member comprises an elongated flexible rod member whose central portion is rigidly attached to the bottom of the vertical leg of said T-shaped weigh beam, said rod member extending beyond each longitudinal end of said weigh beam, each end of said rod member being threaded and adjustable and removably fastened to said transverse plate members in said U-shaped end section of said structural beam member of said walking beam unit.

23. The walking beam conveyor of claim 21 wherein said plurality of flexure members includes at least two lateral flexure members, said lateral flexure members being located adjacent each longitudinal end of said T-shaped weigh beam, said lateral flexure members being a flexible threaded rod member whose ends are securely fastened to the vertical legs of said U-shaped end section of said walking beam member and whose central portion is adjustably fastened to the vertical leg of said T-shaped weigh beam.

24. A walking beam conveyor for conveying articles with means for weighing the articles comprising in combination:
   a. an elongated stationary support frame having a pair of laterally spaced longitudinal beams for supporting the articles to be conveyed, said support frame including a short stationary section of lower elevation at one end;
   b. a horizontally movable carriage including a pair of wheeled trucks operable between said laterally spaced longitudinally beams of said support frame, said carriage located on the longitudinal centerline of the conveyor;
   c. a vertically movable walking beam unit having an article engaging top surface and connecting said trucks so said trucks move in unison;
   d. an hydraulically operated power cylinder supported on each truck having a vertically movable piston rod connected to and supporting said walking beam unit;
   e. a guide bearing radially supporting the vertical movement of said piston rod on each of said power cylinders, said guide bearing supported by said truck in a position with the bore of said guide bearing in axial alignment with the vertical axis of said piston rod and said guide bearing located between said power cylinder and the connection of said piston rod to said walking beam unit to prevent any lateral force from said walking beam unit being applied to and causing bending in said piston rod;
   f. a self-contained hydraulic power unit mounted in each of said trucks for operating said power cylinder to raise and to lower said article engaging surface of said walking beam unit from a position located below the top of the laterally spaced longitudinal beams to a position located above the top of the laterally spaced longitudinal beams of said stationary support frame;
   g. hydraulic power means connected to said walking beam unit for moving said carriage horizontally;
   h. a plurality of load cells laterally spaced from the path of said walking beam unit and mounted on said short section of lower elevation at one end of said stationary support frame;
   i. two laterally spaced longitudinal weigh beams engaging the tops of said load cells, said weigh beams having a top surface located above the top of said laterally spaced beams of said supporting frame to receive the articles to be weighed, said weigh beams further located within the path of travel of said walking beam unit but laterally spaced therefrom so that when said walking beam unit picks up and moves the articles from the stationary laterally spaced longitudinal beams, the articles are deposited on said weigh beams for weighing by said load cells as the walking beam unit is lowered; and
   j. a plurality of flexure members connected between said weigh beams and said stationary support frame to restrain said weigh beams in the longitudinal and the lateral directions of the conveyor, but to permit free vertical movement of said weigh beams for accurate weighing of the article by said load cells.

25. A walking beam conveyor for conveying articles with means for weighing the articles comprising in combination:

a. an elongated stationary support frame having a pair of laterally spaced longitudinal beams for supporting the articles to be conveyed;
b. a horizontally movable carriage including a pair of wheeled trucks operable between said laterally spaced longitudinal beams of said support frame, said carriage being located on the longitudinal centerline of the conveyor;
c. a vertically movable walking beam unit having an article engaging top surface and connecting said trucks so said trucks move in unison, said walking beam unit further having an elongated structural beam member having an open top, U-shaped section at one end, said end section beam longer than the length of the largest article to be weighed;
d. an hydraulically operated power cylinder supported on each truck having a vertically movable piston rod connected to and supporting said walking beam unit;
e. a guide bearing radially supporting the vertical movement of said piston rod on each of said power cylinders, said guide bearing supported by said truck in a position with the bore of said guide bearing in axial alignment with the vertical axis of said piston rod and said guide bearing located between said power cylinder and the connection of said piston rod to said walking beam unit to prevent any lateral force from said walking beam unit being applied to and causing bending in said piston rod;
f. a self-contained hydraulic power unit mounted in each of said trucks for operating said power cylinder to raise and lower said article engaging top surface of said walking beam unit from a position located below the top of the laterally spaced longitudinal beams to a position located above the top of the laterally spaced longitudinal beams of said stationary support frame;
g. hydraulic power means connected to said walking beam unit for moving said carriage horizontally;
h. a plurality of load cells mounted and supported within said open top end section of said walking beam structural beam member;
i. a weigh beam engaging the tops of said load cells, said weigh beam having a top surface located slightly above the article engaging top surface of said walking beam unit, said weigh beam having a length slightly greater than the length of the largest article to be weighed, said top surface of said weigh beam receiving the article to be weighed after said walking beam unit has lifted the article above the level of the top of said laterally spaced longitudinal beams of said stationary support frame; and
j. a plurality of flexure members connected between said weigh beam and said stationary support frame to restrain said weigh beam in the longitudinal and the lateral directions of the conveyor, but to permit free vertical movement of said weigh beam for accurate weighing of the article by said load cells.

* * * * *

PO-1050
(5/69)

UNITED STATES PATENT OFFICE
CERTIFICATE OF CORRECTION

Patent No. 3,736,997                        Dated June 5, 1973

Inventor(s) ROBERT G. BOTTORF

It is certified that error appears in the above-identified patent and that said Letters Patent are hereby corrected as shown below:

Column 1, line 27, after "application" insert --(now abandoned)--.

Column 2, line 17, after "cells" insert a comma.

Column 2, line 26, change "is" to --its--.

Column 5, line 25, delete "Figs. 3 and 4" and insert --Fig. 3--.

Column 5, line 26, after "58" insert --(Fig. 4)--.

Column 5, line 37, delete "are" and insert --is--.

Column 8, line 46, change "include" to --includes--.

Column 11, line 62, change "extend" to --extends--.

Column 13, line 66, change "unit" to --until--.

Signed and sealed this 1st day of April 1975.

(SEAL)
Attest:

RUTH C. MASON
Attesting Officer

C. MARSHALL DANN
Commissioner of Patents
and Trademarks